J. J. PHILLIPS.
CONVEYER.
APPLICATION FILED APR. 24, 1914.
1,128,898.
Patented Feb. 16, 1915.
2 SHEETS—SHEET 1.
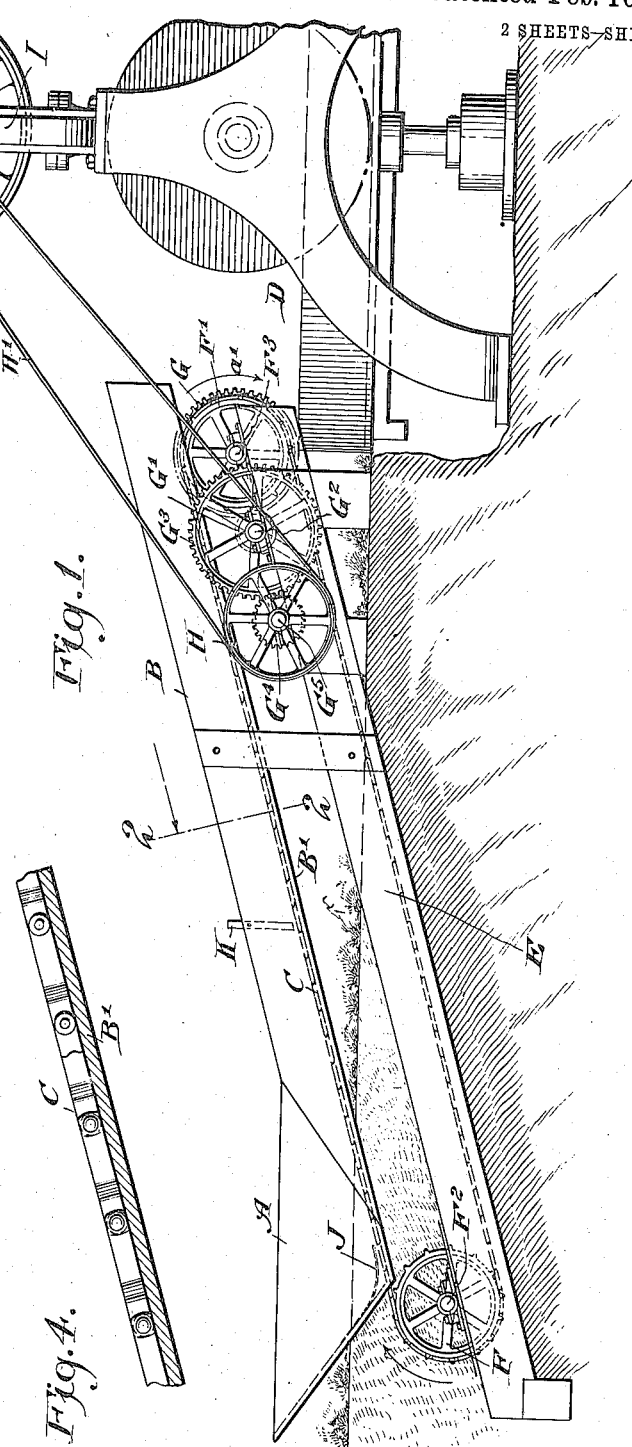
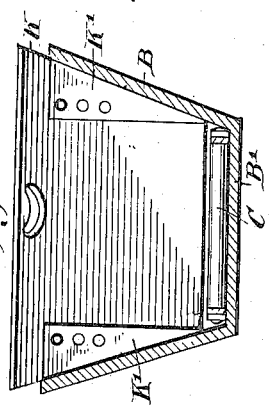
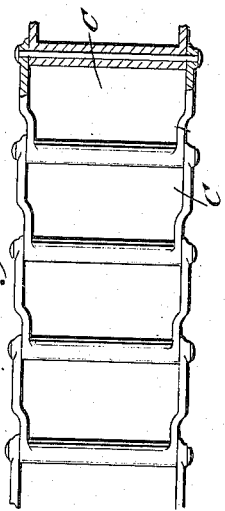
WITNESSES
INVENTOR
James J. Phillips
BY
Munn & Co.
ATTORNEYS

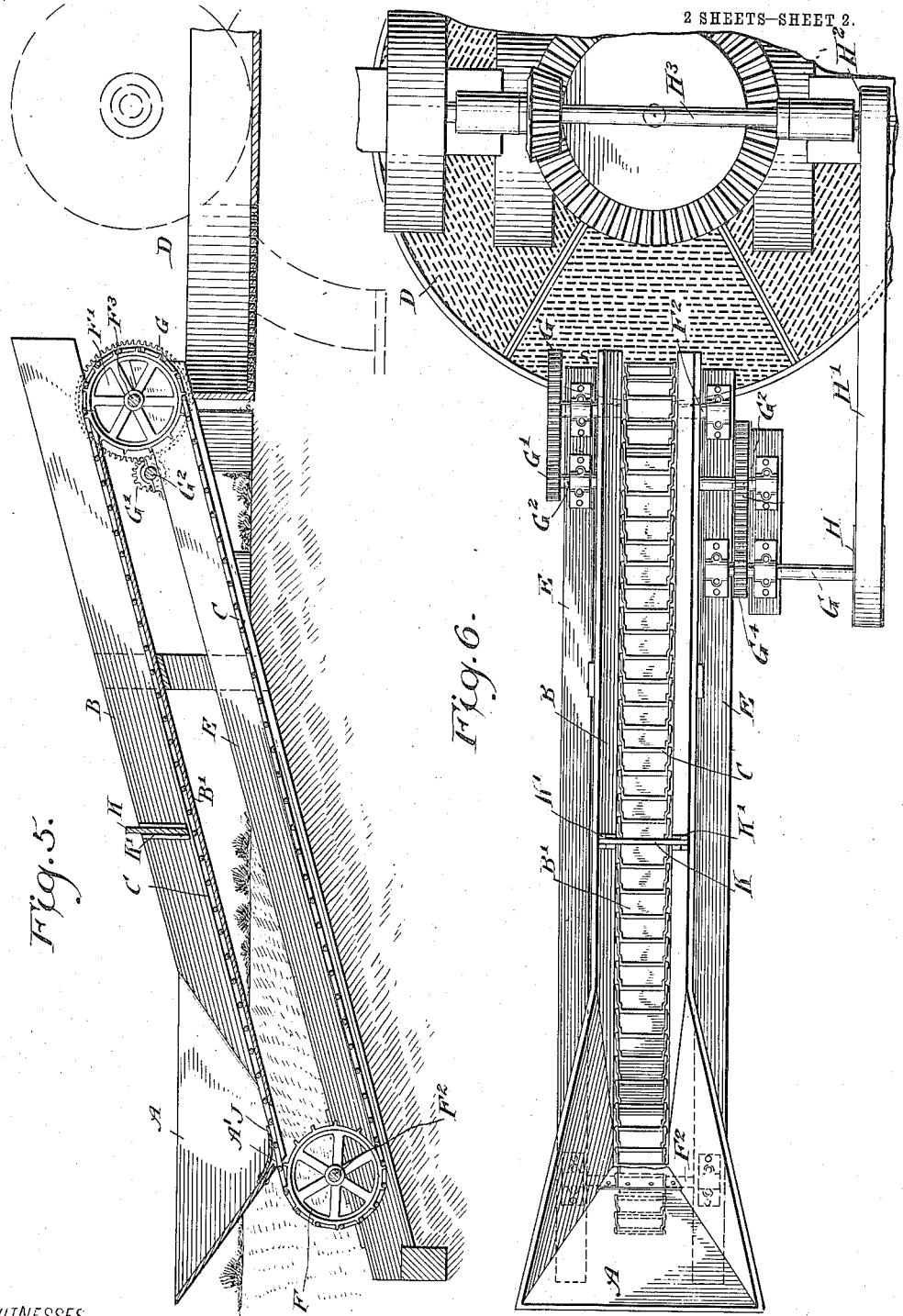

UNITED STATES PATENT OFFICE.

JAMES JASPER PHILLIPS, OF BROOKHAVEN, MISSISSIPPI.

CONVEYER.

1,128,898.

Specification of Letters Patent.

Patented Feb. 16, 1915.

Application filed April 24, 1914. Serial No. 834,143.

*To all whom it may concern:*

Be it known that I, JAMES J. PHILLIPS, a citizen of the United States, and a resident of Brookhaven, in the county of Lincoln and State of Mississippi, have invented a new and Improved Conveyer, of which the following is a full, clear, and exact description.

The object of the invention is to provide a new and improved conveyer more especially designed for carrying clay or similar materials from a receiving hopper to a dry pan, and arranged to permit convenient regulation of the amount of the material to be delivered to the dry pan according to the condition of the material at the time.

In order to accomplish the desired result use is made of a trough extending from a dry pan in a downward direction and terminating in a hopper, an endless carrier chain having its upper run entering the hopper and extending over the bottom thereof and that of the trough, the upper end of the conveyer chain extending over the said dry pan so that the clay or other material is carried by the said chain from the hopper into the dry pan. Use is also made of a regulating gate in the trough, to regulate the amount of material carried upward by the carrier chain, and use is also made of a flexible guard arranged between the bottom of the hopper and extending over the entering portion of the conveyer chain to prevent the clay contained in the hopper from passing out through the entrance opening in the hopper.

A practical embodiment of the invention is represented in the accompanying drawings forming a part of this specification, in which similar characters of reference indicate corresponding parts in all the views.

Figure 1 is a side elevation of a conveyer in position; Fig. 2 is an enlarged cross section of the trough, the upper run of the conveyer chain and the regulating gate, the section being on the line 2—2 of Fig. 1; Fig. 3 is a plan view of a portion of the conveyer chain with part shown in section; Fig. 4 is a side elevation of the same in position on the bottom of the trough, the latter being shown in section; Fig. 5 is a sectional side elevation of the conveyer; and Fig. 6 is a plan view of the same.

The hopper A of the conveyer has its top arranged a short distance above the ground to permit of conveniently dumping clay or like material into the said hopper from which the material is carried upward through an upwardly-inclined trough B by the use of a conveyer chain C, which latter finally delivers the material to a dry pan D of usual construction and set on the ground, as indicated in Figs. 1 and 5. The conveyer is mounted on a suitable framework E, the lower portion of which extends into a cut formed in the ground so that the top of the hopper A is the desired distance above the ground for the purpose previously mentioned, and the upper end of the trough B is a desired distance above the top of the dry pan D for the clay to drop into the said dry pan.

The conveyer belt C passes around sprocket wheels F and F' having their shafts $F^2$, $F^3$ journaled in suitable bearings attached to the lower and upper ends of the framework E. The shaft $F^3$ is provided with a gear wheel G in mesh with a pinion G' (see Figs. 5 and 6) attached to a shaft $G^2$ journaled in suitable bearings arranged on the framework E, and on the shaft $G^2$ is secured a gear wheel $G^3$ in mesh with a pinion $G^4$ secured on a shaft $G^5$ journaled in bearings mounted on the framework E. On the shaft $G^5$ is secured a pulley H connected by a belt H' with a pulley $H^2$ secured to a shaft $H^3$ journaled in suitable overhead bearings attached to a support I arranged outside of the dry pan D, it being understood that the shaft $H^3$ is located centrally above the dry pan D and is used for actuating the usual operating devices of the dry pan D. It is understood that when the shaft $H^3$ is rotated a rotary motion is given by the pulleys $H^2$, H and the belt H' to the shaft $G^5$, which by the gearing described rotates the shaft $F^3$ whereby the sprocket wheel F is rotated in the direction of the arrow $a'$ to cause the upper run of the conveyer chain C to travel upward on the bottom B' of the trough B.

It is understood that the sprocket wheels F and F' are so arranged that the upper run of the conveyer chain C enters the hopper A by way of an opening A' at the bottom of the hopper and then passes up over the bottom B' of the trough B, as plainly indicated in Figs. 2 and 5. As the conveyer chain C passes through the hopper A it carries the clay or other material along and up through the trough B to finally drop the material into the dry pan D. In order to prevent the clay from passing out of the opening A', use is made of a guard J attached to the lower side of the hopper A and extending over the upper run of the conveyer chain C thus closing the opening A' and preventing the clay from passing through the said opening. In practice, the guard J is preferably made of canvas or other suitable fabric material. In order to regulate the amount of clay or other material carried upward through the trough B, use is made of a gate K held vertically adjustable in guideways K' attached to the sides of the trough B, as plainly shown in Figs. 5 and 6. The lower end of the gate K extends within a short distance of the upper run of the conveyer chain C so as to allow but a certain amount of clay to be carried upward by each link of the conveyer chain C, thus insuring a uniform delivery of the material to the dry pan D.

It is understood that by the arrangement described the clay or like material can be readily dumped into the hopper A and delivered in the desired amount to the dry pan D to be further treated therein in the usual manner. As heretofore practised, the clay was dumped directly in irregular quantities by the use of wheelbarrows into the dry pan D, and as a consequence of this irregular feeding the mullers in the dry pan did not properly act on the damp and bulky mass dumped into the pan; besides the mullers worked with irregular speed to overcome the sudden increase in the resistance of the bulky mass. With the use of the conveyer described the feeding of the clay into the pan is uniform to insure a thorough mixing of the component parts of the clay and the formation of a better brick. As a further result the speed of the engine is not checked by an overloaded dry pan and the output is considerably increased over the old method.

Having thus described my invention, I claim as new and desire to secure by Letters Patent:

1. The combination with a receiver, and the shaft for actuating the operating devices of said receiver, of an inclined trough having its upper end extending to the receiver, a hopper at the lower end of the trough, an endless conveyer having its upper run extending through the hopper and over the bottom of the trough and delivering at its upper end into the receiver, and means for operating the conveyer from the said shaft.

2. A conveyer for conveying clay and like material, comprising an inclined trough, a receiver at the upper end of the trough, a hopper at the lower end of the trough, an endless driven conveyer chain having its upper run entering the hopper and extending over the bottom thereof and that of the trough, the upper end of the said conveyer chain extending over the said receiver, and an adjustable gate in the said trough to regulate the amount of the material carried upwardly by the carrier chain in the said trough.

3. A conveyer for conveying clay and like material, comprising an inclined trough, a receiver at the upper end of the trough, a hopper at the lower end of the trough and having an opening at its bottom, an endless driven conveyer chain having its upper run entering the hopper through said opening and extending over the bottom thereof and that of the trough, the upper end of the said conveyer chain extending over the said receiver, and a flexible guard held in the said hopper and extending over the entrance portion of the upper run of the said conveyer chain, said guard closing the opening of the hopper and thereby preventing the material from passing through the same.

In testimony whereof I have signed my name to this specification in the presence of two subscribing witnesses.

JAMES JASPER PHILLIPS.

Witnesses:
MOXIE SIMON,
ELLA STRINGER.